United States Patent [19]

Vick

[11] Patent Number: 4,984,872
[45] Date of Patent: Jan. 15, 1991

[54] WIDE VIEWING ANGLE AVIONICS LIQUID CRYSTAL DISPLAY

[75] Inventor: Gerald L. Vick, Mount Vernon, Iowa

[73] Assignee: Rockwell International Corporation, El Segundo, Calif.

[21] Appl. No.: 367,066

[22] Filed: Jun. 16, 1989

[51] Int. Cl.⁵ .......................... G02F 1/13; H01J 1/62; H01J 63/04
[52] U.S. Cl. .................................... 350/321; 350/345; 313/483
[58] Field of Search ............... 350/321, 387, 174, 573, 350/444, 3.7, 3.72, 338, 345, 353, 337, 339 D, 334; 362/19, 310, 355; 434/43; 313/483

[56] References Cited

U.S. PATENT DOCUMENTS 3,915,548 10/1975 Opittek et al. ............ 350/3.72
4,106,859 8/1978 Doriguzzi et al. .......... 350/338
4,171,874 10/1979 Bigelow et al. ............ 350/444

OTHER PUBLICATIONS

P. Hariharan, *Optical Holography Principles, Techniques and Applications*, Cambridge University Press, 1984, pp. 191–193.
D. G. McCauley, C. E. Simpson, and W. J. Murbach, "Holographic Optical Element for Visual Display Applications", in Applied Optics, Feb. 1973.

Primary Examiner—Bruce Y. Arnold
Assistant Examiner—James Phan
Attorney, Agent, or Firm—Gregory G. Williams; M. Lee Murrah; H. Fredrick Hamann

[57] ABSTRACT

A wide viewing angle avionics liquid crystal display is disclosed which utilizes a planar holographic optical element collimator disposed between the liquid crystal panel and the back light source. Also disclosed a method and apparatus for manufacturing a planar holographic optical element collimator.

8 Claims, 1 Drawing Sheet

WIDE VIEWING ANGLE AVIONICS LIQUID CRYSTAL DISPLAY

CROSS REFERENCE

This application relates to the subject matter of a co-pending application by G. L. Vick, entitled, "Holographic Optical Element Collimator and Method and Apparatus for Manufacture" filed on the same date herewith, assigned to the same assignee, the serial number of which is 366,812; and the subject matter is hereby incorporated herein by this reference.

FIELD OF INVENTION

The present generally relates to liquid crystal displays (LCDs) and more particularly concerns flat panel LCDs for use in an aviation environment with a diffuse back light, and even more particularly concerns flat panel LCDs for avionics applications with diffuse back lamps and with enhanced viewability for off center viewing angles.

BACKGROUND OF THE INVENTION

In the past, it has been well known to display engineers that LCDs work best with light passing therethrough at normal or near normal angles of incidence. Light passing through LCD cells can suffer a change in the state of polarization which are a function of wavelength and make objectional changes in the color and contrast of the display when viewed off axis. One solution to this problem is to collimate the light entering the LCD cell from its back light and to let it pass through the cell, at or near normal incidence and then, decollimate or diffuse the light after it has passed through the cell so that, it can be viewed from all directions without objectional color or contrast changes.

While displays which utilize such a collimation of light have been used in the past, they do suffer from several serious drawbacks. One problem is the inclusion of bulky optics introduced between the LCD cell and the back light. These optics have been typically lenses or reflectors and have objectional drawbacks such as size and cost.

Consequently, there exists a need for improvement in avionics LCDs which have enhanced viewability from off axis viewing angles.

SUMMARY OF THE INVENTION

It is an object of the present invention to provide a compact avionics LCD with enhanced viewability from off axis positions.

It is a feature of the present invention to include a planar collimator disposed between a diffuse back light source and a polarizer disposed upon a LCD cell.

It is an advantage of the present invention to provide for enhanced viewability from off axis points by collimating the light through the LCD cell.

It is another advantage of the present invention to have a wide viewing angle LCD with reduced size and cost.

The present invention provides an improved avionics LCD flat panel which is designed to satisfy the aforementioned needs, produce the above described objects, include the previously discussed features, and achieve the disclosed advantages. The present invention is a "lensless" flat panel display in the sense that the bulk optical lenses used for collimating a diffused back light source, have been eliminated. Instead, a planar collimator is disposed between a polarizer affixed to the LCD and the diffuse back light source.

Accordingly, the present invention includes a planar LC panel, a planar polarizer disposed upon one side of said planar, LC panel, a planar collimator disposed on said planar polarizer, and a diffuse back lamp disposed adjacent to said planar collimator.

BRIEF DESCRIPTION OF THE DRAWINGS

The invention will be best understood by a reading of the description in conjunction with the appended drawings, in which.

DETAILED DESCRIPTION

Figure 1:
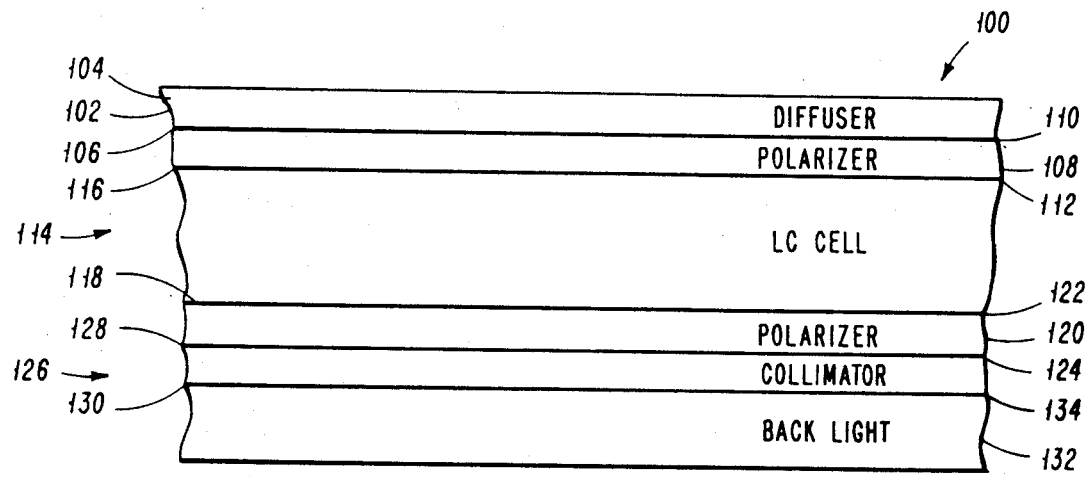
FIG. 1 is a cross-sectional representation of an avionics flat panel LCD, of the present invention, which includes a planar collimator disposed between the diffuse back light and the LCD cell.

Now referring to FIG. 1, there is shown a flat panel LCD, of the present invention, generally designated 100. The LCD 100 is essentially a sandwich of planar components which include diffuser 102, having a front viewing surface 104 and a back surface 106. Front viewing surface 104 and back surface 106 are preferably parallel. A front polarizer 108 having a top planar surface 110 and a parallel bottom surface 112. Back surface 106 of diffuser 102 is adjacent to top planar surface 110 of polarizer 108. LCD cell 114 is shown having a top surface 116 and a bottom surface 118. Top surface 116 of LCD cell 114 is adjacent to bottom planar surface 112 of front polarizer 108. A back polarizer 120 is shown having a top surface 122 and a parallel bottom surface 124. Top surface 122 of bottom polarizer 120 is adjacent to bottom surface 118 of LCD cell 114. A planar collimator 126 is shown having a top surface 128 and a parallel bottom surface 130. Top surface 128 of collimator 126 is adjacent to bottom surface 124 of bottom polarizer 120. Back light assembly 132 is shown having a top planar surface 134. Bottom surface 130 of collimator 126 is adjacent to top surface 134 of back light 132.

Diffuser 102, polarizers 108 and 120, as well as LCD cell 114 are generally known in the art. The back light 132 is a source of diffuse illumination, such as a plurality of fluorescent lamps.

Collimator 126 is a planar collimator attached directly to the back polarizer 120. Collimator 126 may either may be a rugate filter or a holographic optical element (HOE).

The rugate filter is a device which is used as an angularly selective filter, as well as a wavelength selective filter. The rugate filter passes a predetermined wavelength within a predetermined angular cone, while all other wavelengths of light will be reflected. Rugate filters are generally known in the art.

The collimator 126 may also may be holographic optical element (HOE) of the type described in the co-pending cross-referenced patent application. Now referring to FIG. 2, there is shown an apparatus generally designated 400 which includes a cylindrical optical chamber 402 having parallel reflecting sides 404 and 406, and transparent back surface 408, having a interior surface 410 and an exterior surface 412. Disposed on interior surface 410 of transparent back surface 408 is a negative lens 414. Disposed on exterior surface 412 of back surface 408 is a right optical stop 416 and left optical stop 418, for regulating the angle of incidence of the reflected object beam 427. Laser 420 is shown coupled with a beam expander 422, which in combination, produces a divergent coherent light source. Light from said divergent coherent light source passes either through the negative lens 414 and produces a collimated plane wave 424 which serves as a reference beam, or passes between the optical stops 416 and 418 and the negative lens 414. The light rays 425 and 426 which are not transmitted through the negative lens 414, and do not, thereby, become a part the reference beam 424, continue unperturbed and diverge until being reflected by wall 406 and 404, respectively, of optical chamber 402. Divergent light rays 425 and 426 are reflected from walls 404 and 406 toward a central location in chamber 402. Disposed at a central location in chamber 402 is a holographic recording medium 428. Incident upon recording 428 are reflected rays 427 and 429 and reference beam 424. The dimensions of negative lens 414, the thickness of transparent back surface 408, the dimensions and position of optical stops 416 and 418, together with the separation distance of walls 404 and 406, as well as the positioning of holographic recording medium 428 are variable and are largely a function of the designer's choice and a manipulation of these dimensions will result in a manipulation of the object beam incident upon holographic recording medium 428.

The optical chamber 402 can be of any suitable shape, but a rectangular or cylindrical shape is preferred. If a cylindrical shape is used, then optical stops 416 and 418 would be a single washer shaped stop.

Figure 2:
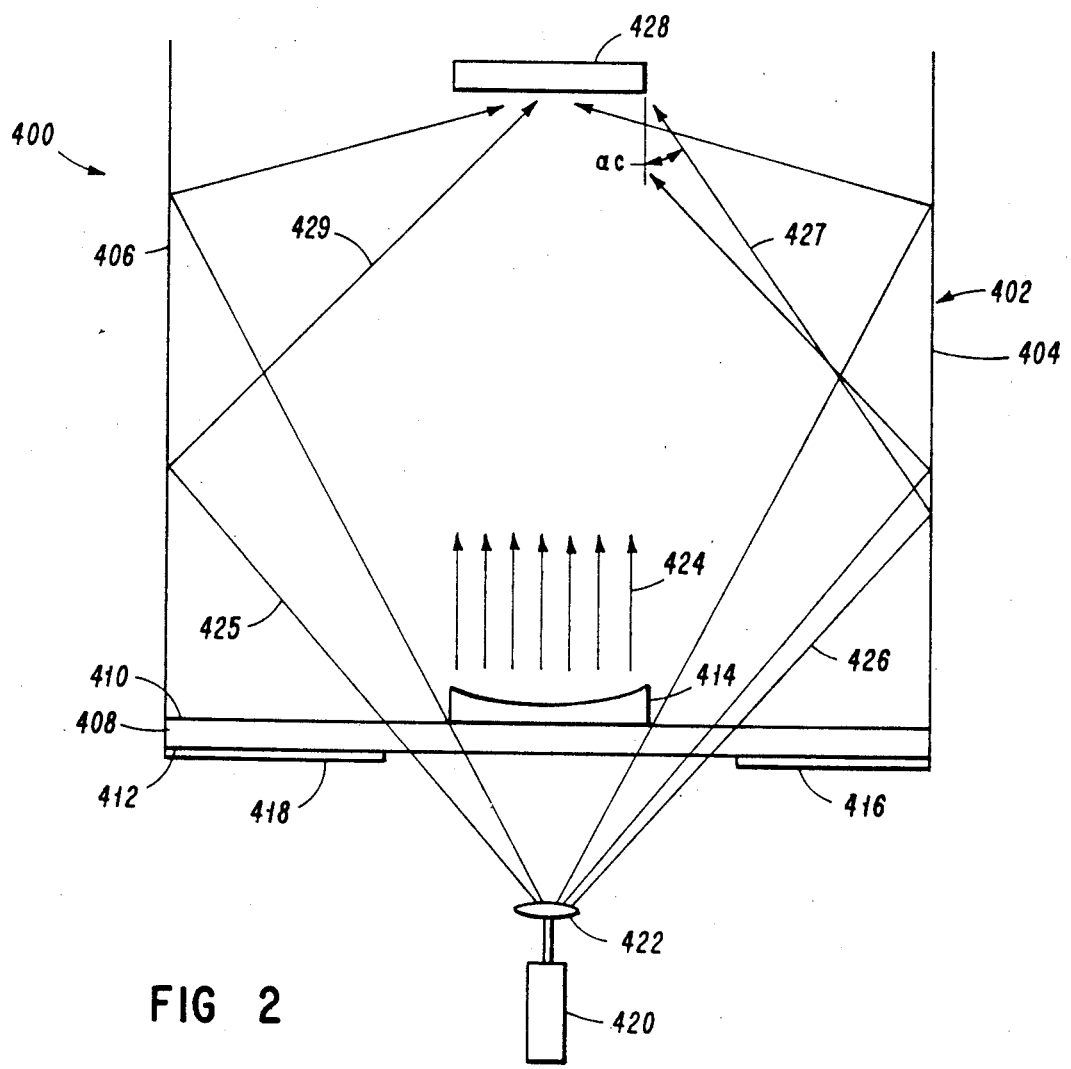
FIG. 2 is a schematic representation of an apparatus for making a holographic optical element collimator which includes an optical chamber for reflecting light beams toward the holographic recording medium.

In operation, the apparatus of FIG. 2 shows a complete optical set up for producing a holographic optic element collimator of the present invention, the laser provides a source of coherent light while the beam expander causes the light to diverge. A portion of the diverging light is intercepted by the negative lens and converted back into a plane wave, which is utilized as a reference beam. The negative lens is preferably a single large lens which is mounted in the central portion of the transparent back surface. Some of the diverging light from the beam expander passes around the negative lens and is reflected from the interior of the cylindrical chamber. The holographic recording medium then is able to record the interference pattern created by the interference of the collimated plane waves, or reference beam, with the reflected beams, from the cylindrical chamber, otherwise known as the object beam.

It is thought that the wide viewing angle avionics liquid crystal display of the present invention and many of its attendant advantages will be understood from the foregoing description, and will be apparent that various changes will be made in the form, construction, and arrangement of the parts and steps thereof without departing from the spirit and scope of the invention or sacrificing all their material advantages, the form herein before described being merely preferred or exemplary in embodiments thereof.

I claim:

1. An avionics liquid display comprising:
   a liquid crystal panel having a front planar surface and a back planar surface;
   a front polarizer disposed upon the front planar surface of said liquid crystal panel;
   a diffuser disposed on said front polarizer;
   a back polarizer disposed on the back planar surface of said liquid crystal panel;
   a planar collimator disposed on said back polarizer;
   a diffuse back light emitting light incident upon said planar collimator.

2. A display of claim 1 wherein said planar collimator comprises a rugate filter.

3. A display of claim 1 wherein said planar collimator comprises a holographic optical element collimator.

4. A display of claim 3 wherein said holographic optical element collimator further comprises a holographic recording medium having a predetermined optical interference pattern recorded thereon.

5. A display of claim 4 wherein said predetermined optical interference pattern further comprises an optical interference pattern resulting from interference from a reference beam normal to the recording medium and an off-angle object beam.

6. An avionics liquid crystal display comprising of a liquid crystal panel having a front planar surface and back planar surface;
   a front polarizer disposed upon the front planar surface of said liquid crystal panel;
   a diffuser disposed on said front polarizer;
   a back polarizer disposed upon the back planar surface of said liquid crystal panel;
   a planar collimator disposed on said back polarizer; and
   a diffuse back light source disposed outwardly of said planar collimator.

7. A display of claim 6 wherein said diffuse back light source comprises a plurality of fluorescent lamps.

8. A compact light weight display device, of the type used in an aviation environment, comprising:
   a diffuse back lamp having a plurality of fluorescent tubes disposed in a planar configuration therein, said diffuse back light source having a planar front surface;
   a planar holographic recording medium, for collimating the diffuse light from said diffuse back light source, said holographic recording medium having a predetermined optical interference pattern recorded thereon, said holographic recording medium being disposed adjacent to said front planar surface of said diffuse back light source;
   a back polarizer for polarizing the collimated light from said holographic recording medium, said back polarizer disposed on the holographic recording medium;
   a liquid crystal panel having a front planar and a back planar surface disposed adjacent to said back polarizer so that said back planar surface of said liquid crystal panel is adjacent with said back polarizer; and
   a front polarizer disposed adjacent to said front planar surface of said liquid crystal panel with a diffuser disposed on said front polarizer.

* * * * *